United States Patent Office 3,395,157  
Patented July 30, 1968

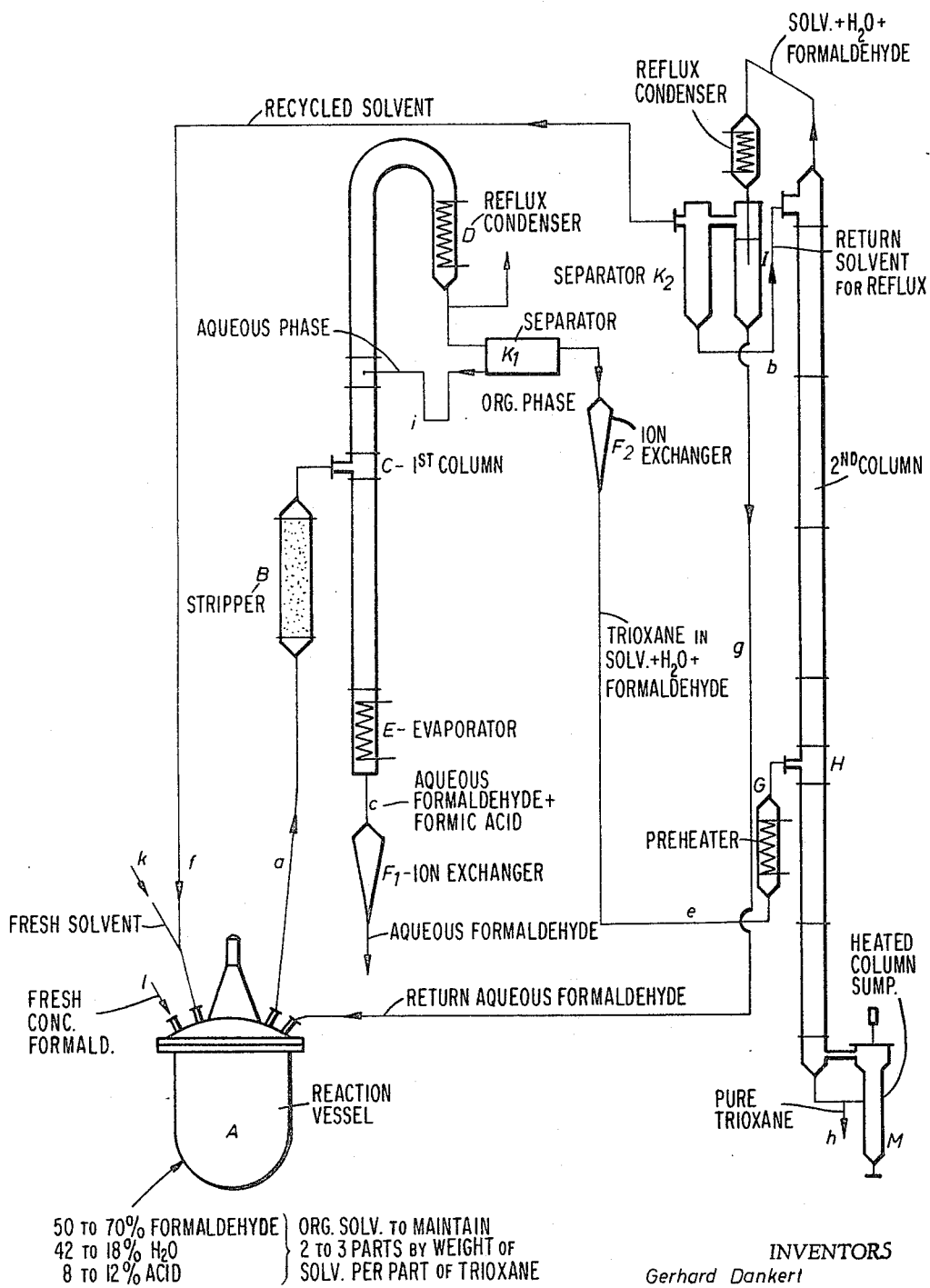

---

3,395,157  
PLURAL STAGE DISTILLATION OF TRIOXANE IN THE PRESENCE OF A WATER-IMMISCIBLE SOLVENT  
Gerhard Dankert, Cologne-Flittard, Dieter Pinkwart, Cologne-Stammheim, Ernst-Ulrich Köcher, Leverkusen, and Herbert Schwarz, Opladen, Germany, assignors to Farbenfabriken Bayer Aktiengesellschaft, Leverkusen, Germany, a corporation of Germany  
Filed Jan. 7, 1966, Ser. No. 519,248  
Claims priority, application Germany, Jan. 13, 1965, F 44,939  
8 Claims. (Cl. 260—340)

ABSTRACT OF THE DISCLOSURE

In order to produce 1,3,5-trioxane in purified form, an aqueous mixture of formaldehyde, a strong acid, recycled trioxane, and a solvent for trioxane which is water-immiscible and lower boiling than trioxane is distilled from a reactor and the distillate is separated into an aqueous phase containing formaldehyde and formic acid, and an organic phase containing mostly trioxane and solvent. Formic acid is removed from the aqueous phase in a first column, leaving aqueous formaldehyde. The organic phase, after removal of formic acid therefrom, is introduced into a second distillation column. Here the trioxane separates as liquid bottoms and the balance of the organic phase is distilled off.

---

The present invention relates to a new and improved process for producing 1,3,5-trioxane. More particularly, the present process is capable of producing trioxane free of formic acid impurity and having a formaldehyde content of less than 0.02% by weight.

It is known that trioxane is formed when aqueous acidic formaldehyde solutions are heated (Journal of the Chemical Society, London, 121 (1922), page 2738). The vapors which are thereby distilled off contain relatively large quantities of formaldehyde as well as trioxane and water. They also contain methanol and formic acid as impurities, which are formed from the formaldehyde by a Cannizzaro reaction. The trioxane isolated by subsequent distillation or extraction from the vapors which distill off invariably contains certain quantities of water, formaldehyde and formic acid. It is true that these quantities are small, but they are nevertheless sufficient to seriously impair the stability of the trioxane on storage and are the cause of uncontrolled polymer formation. Such trioxane is also unsuitable for or has but a limited suitability for polymerization, since polyoxymethylenes having molecular weights in the commercially and technically interesting range, i.e., of at least about 10,000, cannot be produced from this product. In particular, the formic acid impurity acts as a chainbreaking agent and causes appreciable losses in yield.

An additional disadvantage of the prior known processes is that formaldehyde deposits on the relatively cold zones of the distillation apparatus as a polymer and thereby clogs the pipe conduits and condensers.

We have now found a process for the production of ultra-pure trioxane which comprises introducing a mixture containing trioxane, formic acid, formaldehyde and water into a first distillation zone together with a water immiscible organic solvent for said trioxane having a boiling point below that of said trioxane, the weight amount of said solvent being at least about twice that of the trioxane present in said mixture; removing aqueous formaldehyde containing minor amounts of formic acid as the liquid phase from said distillation zone; totally condensing the overhead vapor phase of said distillation zone; separating said total condensate into an aqueous and an organic phase; introducing said organic phase comprising trioxane, organic solvent, formic acid and minor amounts of water and formaldehyde into a second distillation zone after removing the formic acid content thereof; removing organic solvent containing minor quantities of water and formaldehyde as overhead from said second distillation zone and removing liquid phase trioxane as product from said second distillation zone.

The process of the present invention can be carried out in a particularly advantageous manner by heating an initially acidifier mixture of formaldehyde, water and said trioxane solvent which is immiscible with water, introducing the vapors which distill over into the central portion of a first distillation column, drawing off a practically trioxane-free aqueous formaldehyde solution in the sump of this column (which solution can be returned to the process again after having passed through an ion exchanger and optionally after having been concentrated), completely condensing the overhead vapor of the said first column in a reflux condenser, separating the organic and aqueous phases which thereby form, returning the aqueous phase to the first column as liquid reflux and feeding the organic phase containing the trioxane, after passing through an ion exchanger to remove formic acid, into the central portion of a second distillation column, so that the solvent which is immiscible with water, water and formaldehyde distill over as overhead from this column, while highly pure trioxane is obtained in the sump. The latter is preferably discharged from the sump in the absence of oxygen, e.g. in an inert gas atmosphere (nitrogen, carbon dioxide, argon).

It is particularly important in the process of the present invention to introduce the trioxane solvent which is immiscible with water into the vessel in which the first distillation is carried out and to completely condense the overhead vapors of the first column in a reflux condenser.

A 50 to 70% aqueous formaldehyde solution advantageously is used for producing the trioxane containing mixture which is separated by the process of this invention, but solutions of lower concentrations can be used with a resultant higher energy consumption. These formaldehyde solutions are adjusted with strong inorganic or organic acids, e.g. sulphuric acid, p-toluosulphonic acid or 1,5-naphthalene-disulphonic acid, etc., to a pH value between about 1 and 3.

Suitable solvents which are immiscible with water are for example methylene chloride, chloroform, benzene and cyclohexane. These solvents are added continuously to the acidified formaldehyde solution. Generally, two to three times the quantity by weight, based on the trioxane formed, is added; it is also possible to introduce more solvent, although no specific effect is obtained thereby except increasing the energy consumption of the process. It is preferred to use those solvents whose boiling point is below the boiling point of trioxane.

The preferred composition of the liquid mixture which is to be reacted for subsequent separation by the process of the present invention is thus within the following approximate limits:

50 to 70% of formaldehyde,  
42 to 18% of water,  
8 to 12% of acid and has a pH from about 1 to 3. In a continuous process, this composition can be easily maintained by continuously supplying formaldehyde solution to the distillation vessel.

As ion exchangers for the intermediate purification of the solutions forming in this process, it is advantageous to use normal commercial polystyrene resins with tertiary amine groups. However, all other strongly basic ion exchangers may also be employed.

This process produces a particularly pure trioxane, i.e. a trioxane which is practically free from water, formaldehyde and formic acid, and is also particularly economic because it is unnecessary to distill relatively large quantities of water. Additionally, the amount of organic solvent used is substantially less than that required for conventional extractive distillation or extraction procedures. The organic solvent has the additional advantage of preventing undesired polymerization of formaldehyde which deposits as a coating and clogs condensers, conduits, etc. of the separation equipment.

The drawing shows a particularly preferred apparatus for continuously carrying out the process of the present invention. In the drawing, A represents a reaction vessel, B is a stripper device, C is a first distillation column, D is a reflux condenser, E is an evaporator, $K_1$ is a separating vessel for liquid phases of different density, $F_1$ and $F_2$ are ion exchanger filters, G is a preheater, H is a second distillation column, I and $K_2$ are separating devices for aqueous and organic phases, and M is a heated column sump. A preferred embodiment of the process according to the present invention is hereinafter more fully explained by reference to this apparatus.

The reaction vessel A contains a solution of 50 to 70% of formaldehyde, 42 to 18% of water and 8 to 12% of one of the said acids. The composition of this solution is kept constant by continuous addition of concentrated formaldehyde solution. The organic solvent which is immiscible with water is continuously added to this solution, so that there are about 2 to 3 parts by weight of solvent to 1 part by weight of formed trioxane and also this ratio remains constant. The solution is distilled, the vapors which distill over, after passing the stripper device B which retains liquid droplets which may contain acid traces, enter the middle portion of the column C. The overhead product of the column is completely condensed at the reflux condenser D. The condensate is separated in the separating vessel $K_1$ into an organic phase containing the main quantity of the trioxane and an aqueous phase which contains small quantities of trioxane in addition to formaldehyde. This aqueous phase is supplied to the head of column C as liquid reflux, the residual trioxane being extracted from said phase by the ascending solvent vapors. Thus, a trioxane-free aqueous formaldehyde solution is obtained in the sump E of the column C. After removal of formic acid by the ion exchanger $F_1$ and, optionally, after concentration, this solution may be returned to vessel A.

The organic phase from the separating vessel $K_1$ is conducted through an ion exchanger $F_2$ for removal of formic acid and then is fed through the preheater G into the middle portion of the column H. The feeding position of column H is advantageously such that it is at a level approximately $\frac{2}{3}$ of the overall liquid-vapor contact heighth thereof. The organic solution supplied to column H contains trioxane product and impurities, mainly water and formaldehyde, in addition to the solvent. The organic solvent, the water and the formaldehyde are removed as overhead from the column H, condensed and the resulting organic phase and aqueous phase containing formaldehyde are separated in the separating vessel I. Some of the organic solvent returns as reflux to the column and the remaining part is supplied to the vessel A, while the aqueous phase is completely returned to the vessel A.

In the sump M, i.e. at the evaporator, there is formed a highly pure trioxane, which is absolutely free from formic acid and contains only traces of formaldehyde, i.e., <0.02% by weight. In addition, this trioxane is free from polymers. According to a preferred embodiment of the invention, the heating of the sump M is carried out in such a manner that the trioxane formed is subjected to very low thermal loading. For this purpose, the column H is equipped with a sump heater which is designed as a trickle-type or thin-film evaporator. The trioxane recovered is preferably discharged in the absence of atmospheric oxygen and may be used, without further purification to produce polyoxymethylenes of high molecular weight.

The following two comparative tests show the differences in the composition of distillates from an aqueous acidic formaldehyde solution, with and without addition of an organic solvent.

TEST A

In a 4-litre stirrer-type apparatus, 1575 parts of paraformaldehyde, 910 parts of distilled water and 270 parts of p-toluosulphonic acid are heated for 1 hour at an internal temperature of 85° C. under reflux. Thereafter, 232.5 parts are distilled off within 60 minutes through a distillation bridge, without column attachment, at an oil bath temperature of 130° C. The distillate has the following composition:

|  | Percent |
|---|---|
| Water (115 g.) | 49.4 |
| Formaldehyde (84 g.) | 36.2 |
| Trioxane (33.5 g.) | 14.4 |
| Formic acid (0.14 g.) | 0.06 |

TEST B

A mixture identical to that described under Test A is used, but 100 cc. of benzene are continuously pumped into the reaction vessel during the distillation period of 60 minutes at an oil bath temperature of 130° C. The resulting distillate has the following composition:

Aqueous phase=166.2 g.

|  | Percent |
|---|---|
| Water (90.3 g.) | 54.2 |
| Formaldehyde (66.0 g.) | 39.9 |
| Trioxane (9.7 g.) | 5.8 |
| Formic acid (0.16 g.) | 0.1 |

Phase in benzene=108 g.

|  | Percent |
|---|---|
| Benzene (82.4 g.) | 76.3 |
| Formaldehyde (0.42 g.) | 0.39 |
| Formic acid (0.01 g.) | 0.009 |
| Trioxane (25.2 g.) | 23.3 |

This produces the following total composition:

| Phase in benzene— | Percent |
|---|---|
| Benzene | 30.1 |
| Trioxane | 9.2 |
| Aqueous phase— | Percent |
| Formaledhyde | 24.1 |
| Water | 33.1 |
| Trioxane | 3.5 |

EXAMPLE

With reference to the drawing, 31.5 kg. of paraformaldehyde (97.5%), 18.2 kg. of water and 6.2 kg. of p-toluosulphonic acid (92%) are placed in a 100-litre stirrer-type vessel A. The mixture is heated while stirring to the boiling point of the mixture. At this point, the addition of 3.8 kg. of 60% formaldehyde solution per hour and 2 kg. of benzene per hour by way of the pipe $f$ is initiated. Thereafter a mixture of trioxane, water, formaldehyde, benzene and formic acid (see Test B) is continuously distilled through the pipe $a$ into the column C, and the overhead vapors are quantitatively condensed at the reflux condenser D. The condensate collected in the separating flask $K_1$ has the following composition:

Phase in benzene

|  | Percent by weight |
|---|---|
| Trioxane | 32–36 |
| Benzene | 67.5–63.1 |
| Water | 0.15–0.3 |
| Formaldehyde | 0.3–0.5 |
| Formic acid | 0.005–0.01 |

Aqueous phase

| | |
|---|---|
| Trioxane | 8–10 |
| Water | 59.9–54.8 |
| Formaldehyde | 32–35 |
| Formic acid | 0.1–0.2 |

The aqueous phase flows back continuously through a siphon to the head of the column C and is freed from the trioxane by the ascending benzene vapors. At the sump of the column C, 2.8 kg. per hour of formalin solution are extracted through pipe c, and after being concentrated and after removing the formic acid by the ion exchanger $F_1$, this solution is returned again to the reaction vessel. The composition of this formalin solution is as follows:

| | Percent by weight |
|---|---|
| Formaldehyde | 43.5–45.5 |
| Water | 56.1–52.7 |
| Trioxane | 0–1 |
| Formic acid | 0.4–0.8 |

The organic phase is freed quantitatively from the formic acid on flowing through the ion exchanger $F_2$ and is fed through the preheater G into the column H.

With a reflux ratio of $R/D=2$, the following composition is distilled hourly as overhead from column H:

| | | |
|---|---|---|
| $H_2O$ | g | About 10 |
| Formaldehyde | g | 15 |
| Benzene | kg | 6 |
| Trioxane | g | About 20 |

The aqueous formalin solution is separated in the separating vessel I before supplying benzene as reflux liquid. Benzene in the amount of 2 kg. per hour flows from the flask $K_2$ through the pipe f and the aqueous phase flows back through the pipe g into reaction vessel A. The remainder of the benzene is returned through the pipe b as reflux to the head of the column H. In the sump of the column H, 1000 g. of ultra-pure trioxane per hour are withdrawn through the pipe h under nitrogen. The thin-film evaporator M is lubricated by circulated silicone oil. This thin-film evaporator has the object of evaporating a part of the trioxane formed and returning it, in vapor form, to the column. In this way, the heat quantity necessary for evaporating the returned benzene is supplied to the column.

The yield of trioxane, calculated on reacted formaldehyde, is about 97%, while losses due to waste gases are about 10 g. of formaldehyde per hour and, due to formic acid formation, about 25 g. of formaldehyde per hour.

The components of the apparatus which are used are as follows:

Stripper B—Glass tube having a nominal width of 80 mm. and a length of 1 m. filled with glass Raschig rings of 10 mm. diameter;

Column C—Filler body column of a nominal width of 80 mm. and a total length of 3 m. filled with glass Raschig rings of 10 mm. diameter;

Condenser D—Coiled condenser made of glass with a cooling surface of 1.5 $m^2$;

Evaporator E—Glass tube of a nominal width of 80 mm. and a length of 500 mm. with a heating coil for steam having a heating surface of 0.3 $m^2$;

Separating vessels $K_1$ and $K_2$—Cylindrical glass vessels of a nominal width of 200 mm. and a capacity of 15 litres;

Ion exchangers $F_1$ and $F_2$—Conical vessels made of glass having a diameter at the top of 100 mm. and at the bottom of 50 mm. with a 3 litre capacity filled with strongly basic anion exchanger resin based on polystyrene;

Preheater G—Coiled glass heater having a heating surface of 0.1 $m^2$ and heated with hot water;

Column H—Filler body column of a nominal width of 80 mm. and a total length of 6 m. filled with saddleback elements. The feeding position is 2.50 m. above the sump;

Separating vessel I—Cylindrical glass vessel of a nominal width of 100 mm. and a capacity of 5 litres;

Thin-film evaporator M—Thin-film evaporator of 0.09 $m^2$ with mechanically movable wipers.

Gas chromatographic analysis of the trioxane which is obtained shows that it absolutely free from methyl alcohol, methyl formate and formic acid and contains less than 0.02% by weight of formaldehyde and less than 0.01% by weight of water. Additionally, it is completely free from polymer fractions after solidification and remelting.

What is claimed is:

1. The process which comprises introducing a mixture containing trioxane, formic acid, formaldehyde and water into a first distillation zone together with an inert water-immiscible organic solvent for said trioxane having a boiling point below that of said trioxane, the weight amount of said solvent being at least about twice that of the trioxane present in said mixture; removing aqueous formaldehyde containing minor amounts of formic acid as the liquid phase from the bottom of said distillation zone; totally condensing the overhead vapor phase recovered from said distillation zone; separating said total condensate into an aqueous and an organic phase; removing the formic acid content from said organic phase, then introducing said organic phase comprising trioxane, organic solvent and minor amounts of water and formaldehyde into a second distillation zone; removing organic solvent containing minor quantities of water and formaldehyde as overhead from said second distillation zone and removing liquid phase trioxane as product from said second distillation zone.

2. The process of claim 1 wherein said introduced mixture is obtained by reacting a mixture comprising 50–70% by weight of formaldehyde, 42–18% by weight of water and 8–12% by weight of an acid which imparts a pH of about 1 to 3 to said reaction mixture.

3. The process of claim 1 wherein the weight of said organic solvent is from about 2 to 3 times the weight of said trioxane.

4. The process of claim 1 wherein said trioxane product contains less than 0.02% by weight of formaldehyde and is free of formic acid impurity.

5. The process of claim 1 wherein the feed is introduced into said second distillation zone at a level approximately ⅔ of the overall liquid-vapor contact heighth thereof.

6. The process of claim 1 wherein said reaction mixture and organic solvent are continuously supplied to said first distillation zone and wherein liquid product of said first distillation zone and overhead product of said second distillation zone are employed as makeup for the continuous supply of said reaction mixture and said organic solvent.

7. The process of claim 1 wherein separated aqueous phase comprising water, formaldehyde and a minor proportion of trioxane is introduced in said first distillation zone as liquid reflux.

8. The process of claim 1 wherein said organic solvent, removed as overhead from said distillation zone is introduced into said second distillation zone as liquid reflux.

References Cited

UNITED STATES PATENTS

| | | | |
|---|---|---|---|
| 3,024,170 | 3/1962 | Othmer et al. | 203—67 |
| 3,176,023 | 3/1965 | Yamase | 260—340 |
| 3,201,419 | 8/1965 | Sennewald et al. | 260—340 |

WILBUR L. BASCOMB, JR., *Primary Examiner.*